(12) United States Patent
Rachlin

(10) Patent No.: US 7,356,612 B2
(45) Date of Patent: Apr. 8, 2008

(54) METHOD AND APPARATUS FOR STORING AND RETRIEVING DATA RELATED TO PATHS OF A MULTI-PATH, MULTI-TIER NETWORK

(75) Inventor: Elliott H. Rachlin, Scottsdale, AZ (US)

(73) Assignee: Honeywell International Inc., Morristown, NJ (US)

( * ) Notice: Subject to any disclaimer, the term of this patent is extended or adjusted under 35 U.S.C. 154(b) by 994 days.

(21) Appl. No.: 10/465,414

(22) Filed: Jun. 18, 2003

(65) Prior Publication Data

US 2004/0260833 A1 Dec. 23, 2004

(51) Int. Cl.
 *G06F 15/173* (2006.01)
(52) U.S. Cl. ............... 709/242; 709/238; 709/230; 370/230; 370/400
(58) Field of Classification Search ........ 709/230–235; 370/229–235, 400
See application file for complete search history.

(56) References Cited

U.S. PATENT DOCUMENTS

| 4,875,208 | A | * | 10/1989 | Furuhashi et al. | 370/400 |
| 5,115,433 | A | * | 5/1992 | Baran et al. | 370/400 |
| 5,369,784 | A | | 11/1994 | Nelson | |
| 5,467,345 | A | | 11/1995 | Cutler, Jr. et al. | |
| 5,572,512 | A | * | 11/1996 | Cutler et al. | 370/248 |
| 5,751,965 | A | | 5/1998 | Mayo et al. | |
| 5,933,416 | A | * | 8/1999 | Schenkel et al. | 370/254 |
| 6,083,248 | A | | 7/2000 | Thompson | |
| 6,271,845 | B1 | | 8/2001 | Richardson | |
| 6,338,011 | B1 | | 1/2002 | Furst et al. | |
| 6,381,649 | B1 | * | 4/2002 | Carlson | 709/235 |
| 6,393,432 | B1 | | 5/2002 | Flansburg et al. | |
| 6,466,138 | B1 | | 10/2002 | Partyka | |

(Continued)

FOREIGN PATENT DOCUMENTS

EP   1211845   *   5/2002

(Continued)

OTHER PUBLICATIONS

Abbott et al., "Development and Evaluation of Sensor Concepts for Ageless Aerospace Vehicles, Development of Concepts for an Intelligent Sensing System", "NASA Technical Report, NASA/CR-2002-211773", Jul. 2002, pp. 1-138, Publisher: NASA, Published in: Hampton, Virginia.

*Primary Examiner*—Krisna Lim
(74) *Attorney, Agent, or Firm*—Fogg & Powers LLC

(57) ABSTRACT

An apparatus is provided for storing and retrieving data relating to paths through a network having a plurality of linked nodes and a destination node, each node of the plurality of nodes having a counter operable to transmit counter data when the node is operating properly. The apparatus includes a processor coupled to the destination node, which serves as a source of received counter data, a memory coupled to said processor, and a data link to a destination node of the network. The memory contains at least one data structure adapted to associate data relating to designed paths through the network with data relating to the received counter data. The memory also contains processor instructions executable to store said data relating to the received counter data in the at least one data structure. Methods for searching and updating the apparatus are also provided.

43 Claims, 13 Drawing Sheets

U.S. PATENT DOCUMENTS

| | | |
|---|---|---|
| 6,487,604 B1 | 11/2002 | Rochford et al. |
| 6,632,032 B1 | 10/2003 | Dombrowski et al. |
| 6,711,137 B1 | 3/2004 | Klassen et al. |
| 6,952,396 B1 * | 10/2005 | Cottreau et al. ............ 370/222 |
| 7,137,035 B2 | 11/2006 | Sato et al. |
| 2001/0028313 A1 | 10/2001 | McDonnell et al. |
| 2002/0161751 A1 | 10/2002 | Mulgund et al. |
| 2004/0205699 A1 | 10/2004 | Keim et al. |
| 2004/0205713 A1 | 10/2004 | Keim et al. |
| 2004/0225958 A1 | 11/2004 | Halpert et al. |
| 2004/0257243 A1 | 12/2004 | Rachlin |
| 2005/0021632 A1 | 1/2005 | Rachlin |

FOREIGN PATENT DOCUMENTS

| | | |
|---|---|---|
| EP | 1211845 A2 | 6/2002 |

\* cited by examiner

```
/************************/
/*      PIPE Table      */
/************************/ typedef struct {
       char * IntergrationCounterPuiName;
       char * PrimarySecondaryPuiName;
       int PrimaryEnumeration;
       int PipeStatus;
} PipeTableEntry;

static PipeTableEntry PipeTable[] = {
{"GndIntegICtr","",1,0},
```

802 ─╮        804 ─╮       806 ─╮   ╭─ 808

```
{"LADP01MDZZ01U1","LADP01MDAVNJJ",0,0},
{"LADP01MDZZ01U2","LADP01MDAVNSJ",0,0},
{"LADP01MDZZ01U3","LADP01MDAV01J",0,0},
{"LADP08MD4353J2","LADP01MDAW1SJ",1,0},
.................................. etc ........
{"LAPR16FC0617U","",1,0},
{"LAPR13FC0617U","",1,0},
{"","",0}
};
```

FIG. 10

METHOD AND APPARATUS FOR STORING AND RETRIEVING DATA RELATED TO PATHS OF A MULTI-PATH, MULTI-TIER NETWORK

FIELD OF THE INVENTION

The present invention generally relates to data structures for representing communications networks, and more particularly relates to a method and apparatus for storing data relating to a network and data relating to data generated on nodes of the network and for rapidly searching for operable paths through the network from any given network node.

BACKGROUND OF THE INVENTION

Some aerospace systems, such as the International Space Station (ISS) and the Space Transportation System (STS), or Space Shuttle, produce large volumes of telemetry which must be transmitted to terrestrial stations for use by mission controllers and vehicle health managers, among others. The transmission occurs over multi-path, multi-tiered networks which include nodes within and exterior to the space vehicles. Because bandwidth for transmitting the telemetry data is limited, various approaches to bandwidth compression have been attempted, one of which is the transmit-by-exception approach.

In a transmit-by-exception telemetry data transfer, the only data transmitted are those telemetry values which have undergone a significant change since they were last transmitted. This approach can provide substantial bandwidth compression. A resulting difficulty, however, is that the user on the ground cannot tell the difference between data that is not changing because it has not required transmission and data that is not changing because some portion of the network is malfunctioning. Network anomalies may be intermittent, making some telemetry faulty and leaving some telemetry valid. Unchanging data is ambiguous at the point of reception as to the cause for the lack of change.

The problem is exacerbated when the telemetry data is to be used in Integrated Vehicle Health Management (IVHM) systems. IVHMs assess telemetry data using diagnostic and prognostic software to support vehicle health maintenance. Experience has shown that ambiguous telemetry data may cause known IVHM algorithms to produce erroneous results.

One approach is to observe a constantly-changing telemetry data element, or counter, transmitted from the same source node as the transmit-by-exception data to be disambiguated, or target data. The target data may be evaluated as valid if the frequently-changing telemetry data element is seen to change over the time period when the target data was sent. The approach has several weaknesses. First, in a multi-path, multi-tiered communications network signal noise can cause false data values in the counter data, leading an algorithm to conclude that the counter is operating when, in fact, it is not operating. Thus, target data that is invalid may be erroneously seen as valid.

Second, counters that change at different rates on different nodes are utilized. The temporal resolution of a pairing disambiguation scheme for an individual node is the period of that node's counter minus the pulse width of the data bit. The temporal resolution of the disambiguation scheme for the network as a whole is the resolution of the slowest counter in the network. The temporal resolution for the network as a whole matters because IVHM systems need a series of complete "snapshots" of the vehicle system that give, as closely as possible, the state of the vehicle at particular times. If some of the data has gone bad without notice, the snapshots will be flawed and the IVHM system will reach an erroneous conclusion.

Designers and operators of large networks such as those used with ISS and STS often use their own commercial-off-the-shelf (COTS) equipment. Counters of different frequencies are inevitable, and the counter for a particular node may be the most reliably changing telemetry data element rather than the fastest-changing element. Also, the most rapidly updating piece of telemetry from one node may still be slower than the slowest telemetry from another node. Ideally, each node might be equipped with a high-speed clock, but this would quickly recreate the bandwidth-saturation problem that transmit-by-exception telemetry was designed to solve. Likewise, retrofitting each network node with a dedicated counter would be impractical. If one counter in the network operates at 0.1 Hz, it could be nearly 10 seconds before a problem was noticed. Disambiguation schemes with low temporal resolutions are problematic in IVHM systems, so the pairing approach is rejected.

Speed is important in disambiguating telemetry. Raw telemetry arrives for processing in a continuous sequence of batches and a first batch should be completely disambiguated before the next batch arrives. A telemetry disambiguation system as disclosed in copending patent application Ser. No. 10/465,415, entitled METHOD AND APPARATUS FOR DISAMBIGUATING TRANSMIT-BY-EXCEPTION TELEMETRY FROM A MULTI-PATH, MULTI-TIER NETWORK and incorporated herein by reference, may use a data structure representing a network that may be searched for information regarding the status of nodes, paths, and links.

Accordingly, it is desirable to have a data structure representing a network that is rapidly accessible. It is also desired to use the data structure for purposes other than telemetry disambiguation, as a rapidly accessible data structure representing a network has many potential uses. In addition, it is desirable for the data structure to be easily updatable with network node status information. It is also desirable that the data structure be portable to different users. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

An apparatus and method are provided for storing and retrieving data relating to paths through a network having a plurality of linked nodes and a destination node, each node of the plurality of nodes having a counter operable to transmit counter data when the node is operating properly. The apparatus includes a processor coupled to the destination node, which serves as a source of received counter data, a memory coupled to said processor, and a data link to a destination node of the network. The memory contains at least one data structure adapted to associate data relating to designed paths through the network with data relating to the received counter data. The memory also contains processor instructions executable to store said data relating to the received counter data in the at least one data structure. The method comprises the step of receiving counter data arriving at the destination node of the network, determining if the received counter data is changing, and associating, based upon said determination, an indicator of node operability with the linked network node with which said received counter data is associated.

BRIEF DESCRIPTION OF THE DRAWINGS

The present invention will hereinafter be described in conjunction with the following drawing figures, wherein like numerals denote like elements.

FIG. 10 illustrates details of the data structure of the exemplary pipe table;

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
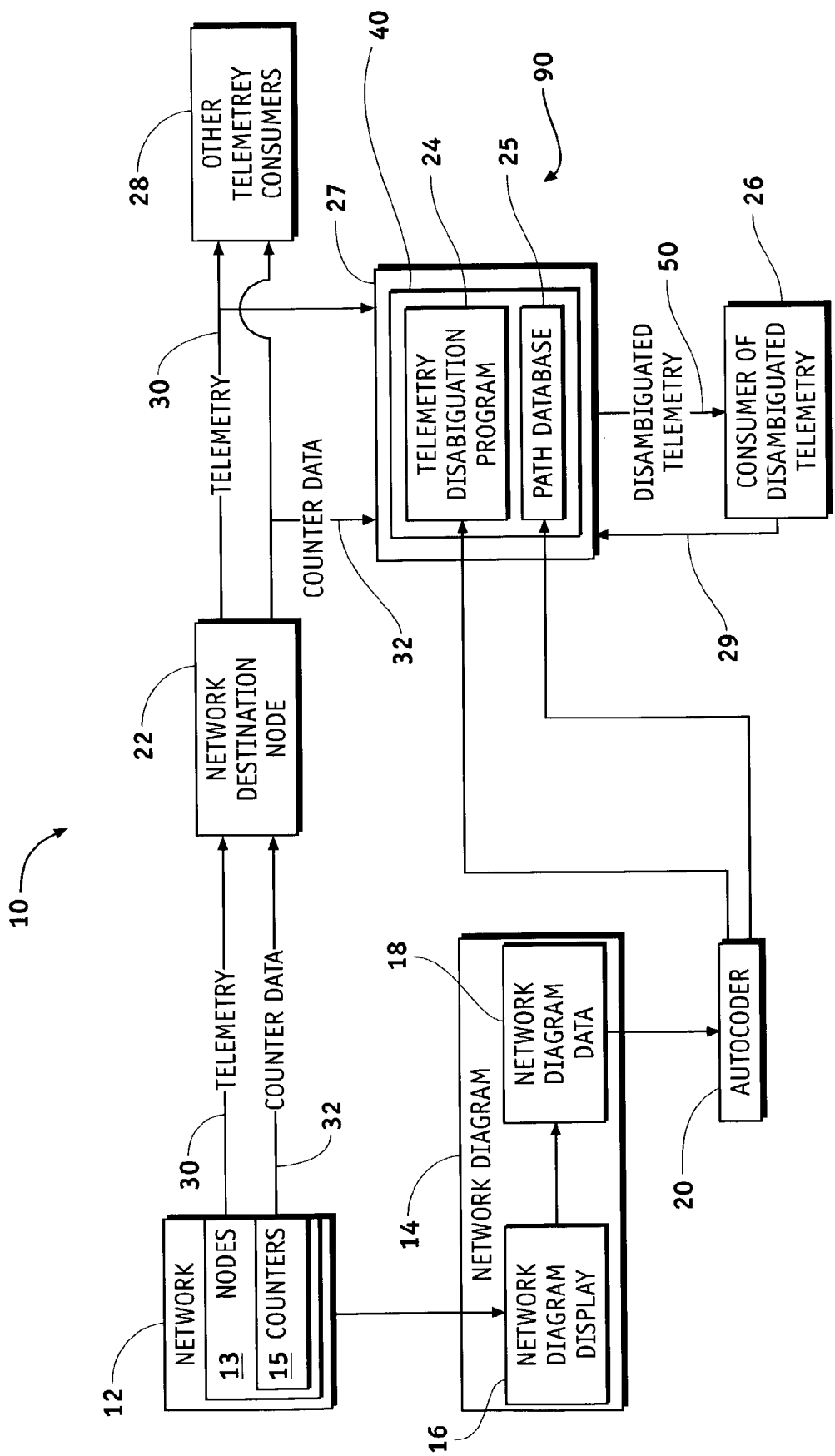
FIG. 1 illustrates a diagram of an exemplary apparatus for disambiguating telemetry.

Referring to FIG. 1, a method for disambiguating telemetry disclosed in co-pending U.S. patent application Ser. No. 10/465,415 incorporated herein by reference, discloses a method for disambiguating telemetry having high temporal resolution. To enable high temporal resolution, a path database 25 must be rapidly searched, given the name of a telemetry data element and seeking the existence of a path through the network for the named telemetry data element. The path database 25 is updateable with pipe status indicators 808 (FIG. 8) or indicators of node operability 808.

The apparatus 90 for storing path data comprises the processor 27, memory 40 containing network data structures 25, or path database 25, instructions for searching 24, or telemetry disambiguating software 24, and a coupling to network ground node 22, or destination node 22 for receiving counter data 32. In most embodiments, counter data 32 is an existing telemetry data 30 element selected for the periodic nature of the data produced. However, in a few embodiments, such counters may be dedicated.

The apparatus 90 may be disposed in streams of telemetry data 30 and counter data 32 from a network ground node 22 to a particular consumer 26 of disambiguated telemetry. In an alternate embodiment, the apparatus 90 may be interposed between a network ground node 22 and a telemetry distribution node (not shown) to provide disambiguated telemetry to all telemetry consumers 26 and 28.

Figure 2:
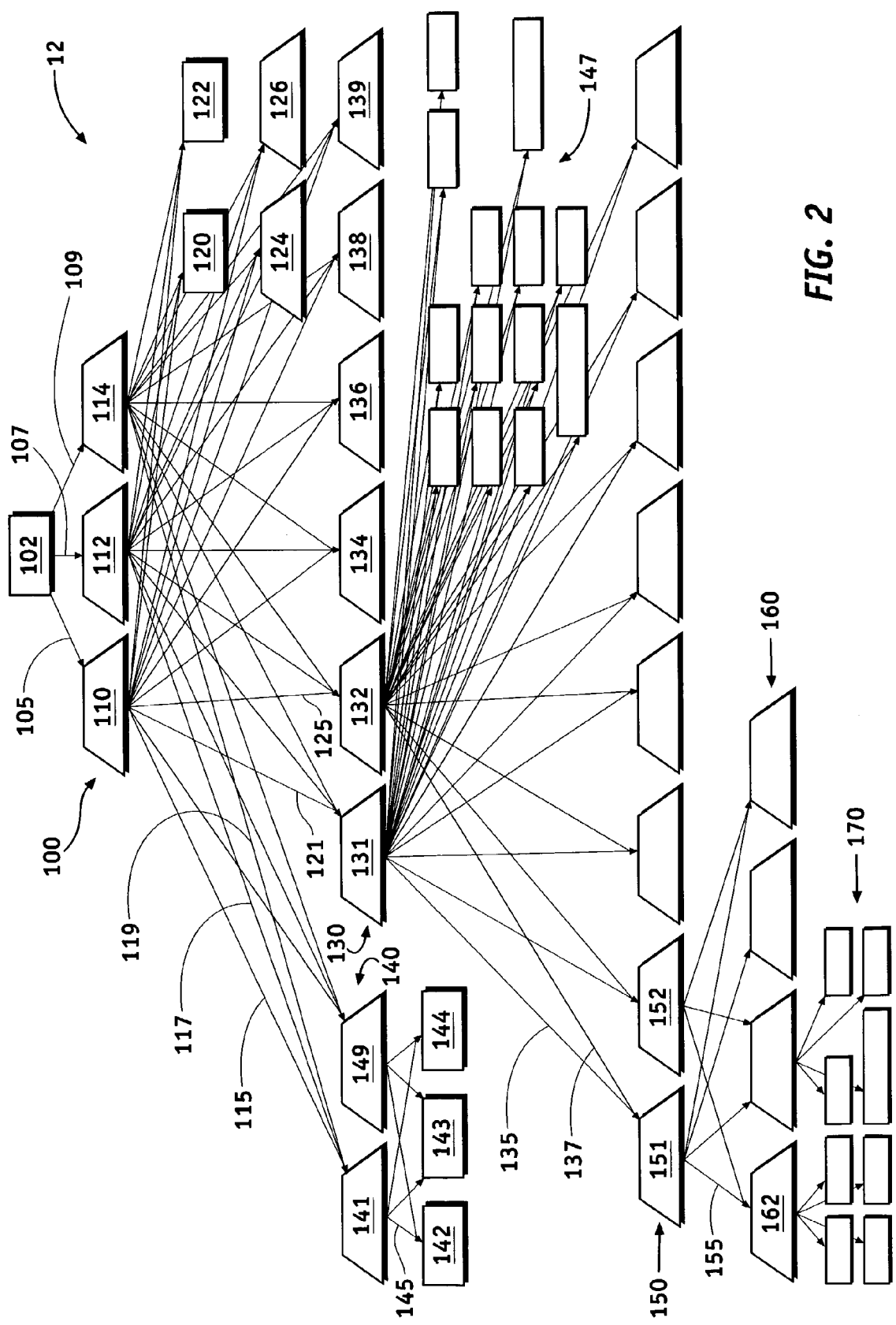
FIG. 2 illustrates portions of an exemplary network.

FIG. 2 shows an exemplary network 12 over which telemetry data is sent by exception. The network 12 comprises relay node icons 110, 112, 114, 124, 126, 131, 132, 134, 136, 138, 139, 141, 149, 151, 152 and 162 shown having a first shape exemplified by a trapezoid, telemetry source no icons (e.g. 120, 122, all of 147) illustrated having a second shape exemplified by a rectangle, and link icons (e.g. 115, 135, 145, 155 and many unlabeled) illustrated having a third shape exemplified as arrows.

Representative relay node 131 may be capable of multiple functions. Relay node 131 may receive telemetry data 30 from other relay nodes, such as 151 and 152, and transmit what it received to a node 110, 112, or 114 in a higher tier 100. Relay node 131 can receive telemetry data 30 and counter data 32 from telemetry source nodes 147 and transmit that telemetry data 30 and counter data 32 to a node 110, 112, or 114 in a higher tier 100. Relay node 131 may generate telemetry data 30 inside itself and send that data to the destination node 102. Relay node 131 may also generate counter data 32, which is a stream of constantly changing data. A data stream is considered "constantly changing" if it changes periodically. Preferably, counter data 32 changes at least as often as the corresponding telemetry data 30 is scheduled to be sent from a common originating node 131.

Telemetry source nodes 120, 122,142-144, 147, and 170 are sources of telemetry data 30 and also sources of counter data 32. Telemetry source nodes 120, 122,142-144, 147, and 170 do not perform relay functions. Telemetry source nodes 120, 122,142-144, 147, and 170 are linked to at least one relay node (e.g. 131). Each link (e.g., 145) connects exactly two nodes (e.g. 141 and 142) and each link may be uniquely identified. A preferred method for link identification is by ordered source node and destination node pairs. For example, a unique identifier for link 145 would be {142, 141}. Links in the embodiment shown in FIG. 2 are illustrated with arrows pointing to a data source.

The network 12 represents a multi-path, multi-tiered network 12. The network 12 is multi-path because there may be more than one way to get from a given node to destination node 102. For example, data may move from any of telemetry source nodes 147 through either of relay nodes 131 and 132, and through any of relay nodes 110, 112, and 114 to destination node 102. Network 12 is considered "multi-tiered" because it has multiple layers, or tiers 100, 130, 140, 150, and 160. The first, highest, tier comprises all nodes directly connected to the destination node 102. The next, lower, tier comprises all nodes directly connected to first tier nodes, etc.

The tiers may correspond to physical relationships of node-bearing components in the network 12. Network 12 may have sub-networks added to it from time to time. For example, the addition of a new module to the ISS brings with it a subnet of telemetry source nodes, links, and relay nodes which must be integrated into the preexisting network 12. Tier 140 is suggestive of an added subnet.

Figure 3:
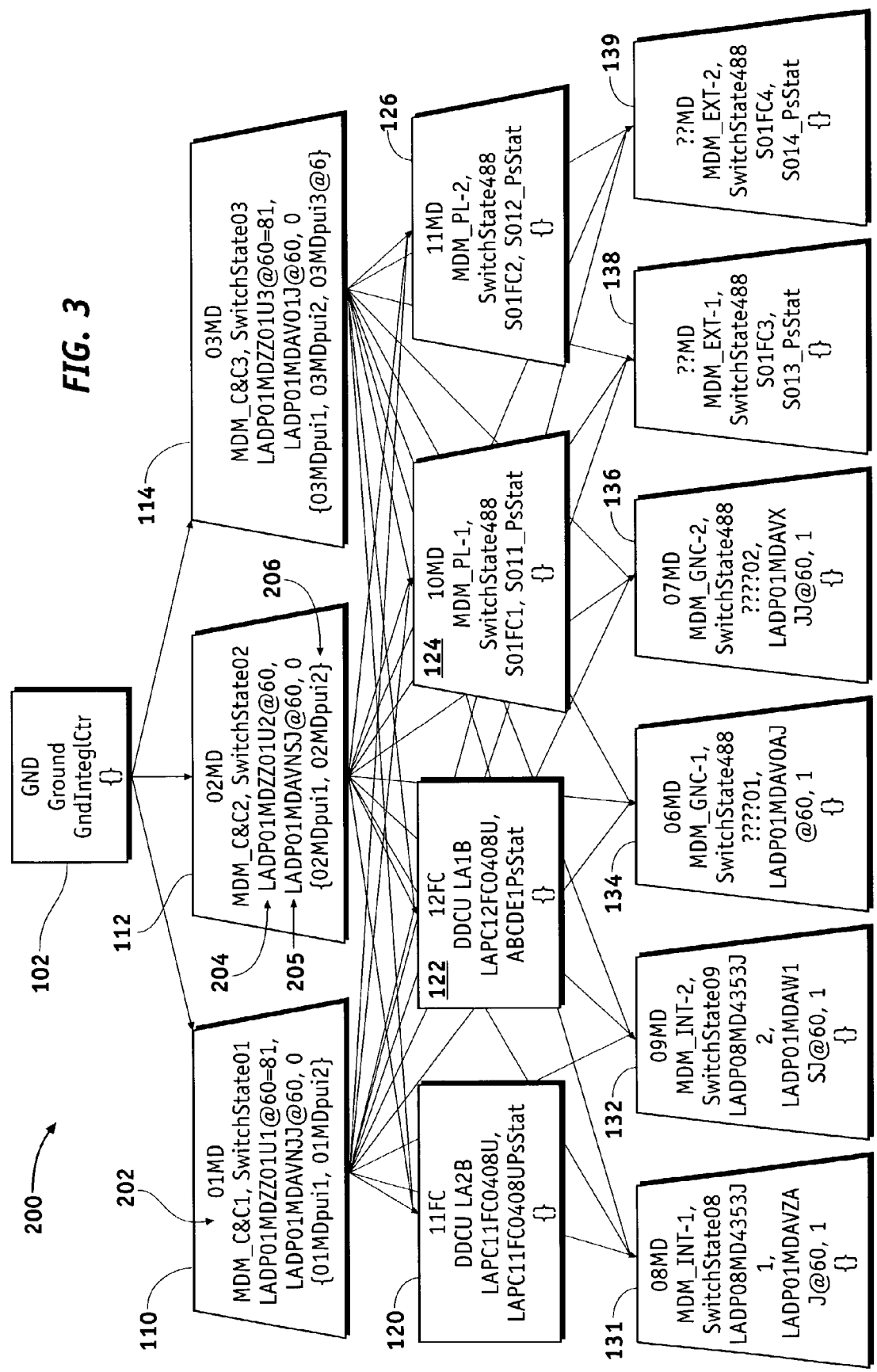
FIG. 3 illustrates details of a section of an exemplary network with associated data.

Referring also to FIGS. 1 and 2, FIG. 3 shows a detailed view of a section 200 of the network 12. Each node has telemetry data element names 206 and other text data 202 associated with it, which could not be shown in FIG. 2, but which may occur with all nodes 13 (FIG. 1). The text data may be associated with the node in a path database 25. For example, associating a counter name 204 with a node in the path database 25 allows the counter name for a given node to be quickly identified. The data relates to the node 13, the network 12, and the data 30 and 32 transferred over the network 12 from the corresponding node 13.

Figure 4:
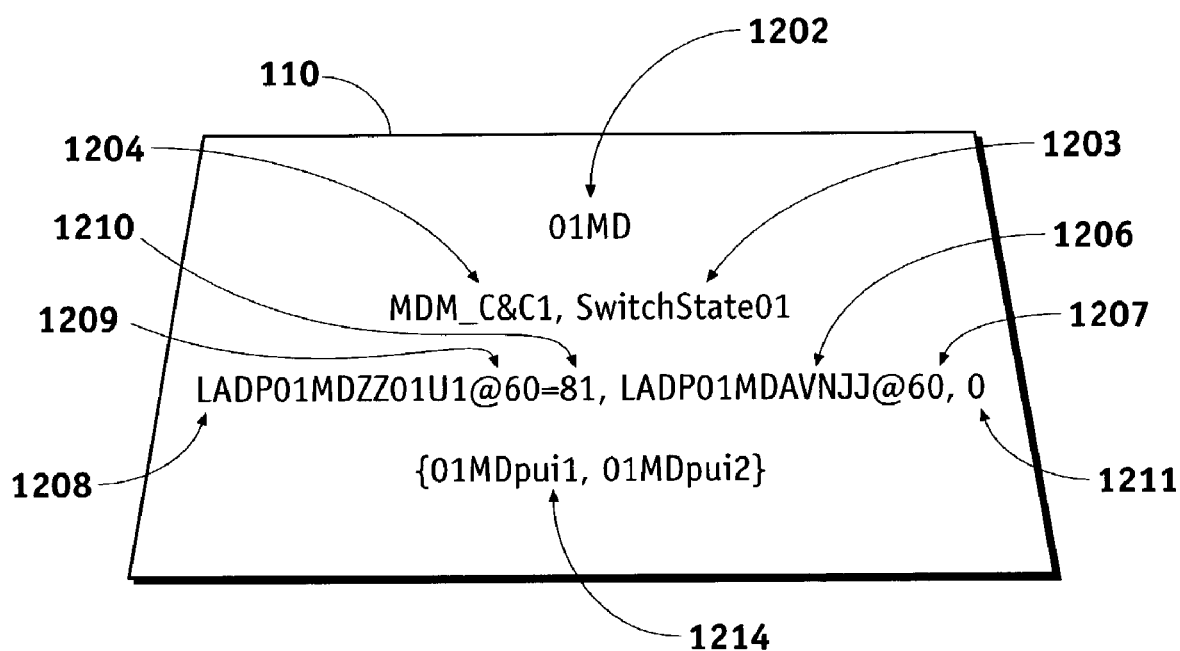
FIG. 4 illustrates details of a relay node of an exemplary network with associated data.

Referring additionally to FIG. 4, the first text string data associated with node 110, "01MD" represents a unique node identifier 1202, used to differentiate relay node 110 from all other relay nodes. Text string data 1204 relates to a name for the node 110. "MDM_C&C1" for example, is the box name for a "Multiplexer-DeMultiplexer_Command and Control 1" relay node 110. The switch state variable name 1203 is an example of text string data which may be associated with a node in a path database 25 (FIG. 1), although not directly related to telemetry disambiguation. The path database 25 may have a variety of uses in network analysis and additional data may be associated with nodes 13 to serve the additional uses. In this example, switch state variable names 1203 have a one-to-one correspondence with relay nodes, permitting node status to be quickly searched by any telemetry consumer 26 having the switch state name 1203 of the node. Text string data 1208 shows a variable name "LADP01MDZZ01U1" for the counter uniquely associated with relay node 110. For simplicity, the counter name used may be the same as the telemetry variable name used in other processing of the telemetry. In an alternate embodiment, the variable names may be unique within the telemetry disambiguation software and a translation to external names may be added. The frequency of counter LADP01MDZZ01U1 is made explicit by a text data string 1209 which designates an update frequency of the counter data 32. For example, text data string 1209, "@60", indicates the counter changes 60 times per minute. The format indicator for counter data 32 from counter LADP01MDZZ01U1 may be designated by a text data string 1210 as, for example, "=81." Default values for frequency and format may be set and relied upon.

Another specialized telemetry data element associated with data flow control is named "LADP01MDAVNJJ" in text data string 1206. LADP01MDAVNJJ is the primary/secondary process unique identifier (PUI) for node 110. The primary/secondary PUI contains a value indicating whether node 110 is in a primary or secondary mode. The primary/secondary status indicator may operate as an on/off switch for the node 110. In primary status, the node 110 sends and relays data to the destination node 102. In secondary status, the node 110 does not send or relay data to the destination node 102. The primary/secondary PUI text data string 1206 contains an update rate substring 1207. Not all relay nodes have primary/secondary PUIs. Those relay nodes which do have primary/secondary PUIs may also have a primary enumeration code 1211. Primary enumeration code 1211 contains the value which the associated primary/secondary PUI uses to indicate primary mode. This is required in a heterogeneous network where nodes manufactured by different entities use different primary/secondary PUI values to indicate primary status.

Additional data to be associated with each nodal icon for any purpose. Given the autocoder 20 function of finding all paths in the network 12 and storing the paths in network data structures 25, other network analysis uses based upon other data associated with network diagram icons may be readily developed. List 1214 of telemetry data elements 01MDpui1 and 01MDpui2 identifies telemetry data elements which may not be associated with data flow control and which originate from the relay node 110 itself.

A unique identifier is a unique name, and a PUI is a name for a data element or stream having a name associated with it. PUI may encompass more named data streams than a strict interpretation of "telemetry" might support, such as data regarding experimental packages onboard the vehicle. Herein, "PUI", "telemetry data element name", "data element name", and "data name" all refer to unique identifiers of data streams being sent over the network. "PUI" is also used to refer to both the name of data and the named data.

Telemetry data source nodes 120 and 122 also have associated text data strings. Each exemplary telemetry data source node has an associated counter name ending in "U" and a status indicator ending in "Stat." In an alternate embodiment, links may have associated text data strings. Text data strings such as 1202 and 1208 may become data stored in the path database 25.

Telemetry disambiguating program 24 may be produced by simply printing the predetermined text of it to a file. That is, the division of functionality between telemetry disambiguating program 24 and path database 25 are preferably such that only the database 25 changes when the structure or status of the network 12 changes. Telemetry disambiguating program 24 may be responsive to an input of a specific telemetry data element name to search for all possible paths from the telemetry data source node where the named telemetry data element originates to the destination node 102. Each path comprises an ordered linear sequence of linked nodes. The processor 27 uses program 24 to check the counter data 32 of each node of each possible path to find if there is any path having all nodes in an operating status. The program 24 may stop searching when it finds a first good path. If one path exists in which all nodes are operating, the input telemetry data element is known to be good-but-unchanging, and so is no longer ambiguous. The program 24 accesses the path database 25 in searching each possible path. The path database 25, or network data structures 25, contain data describing all designed paths from each node to the destination node 102.

Figure 5:
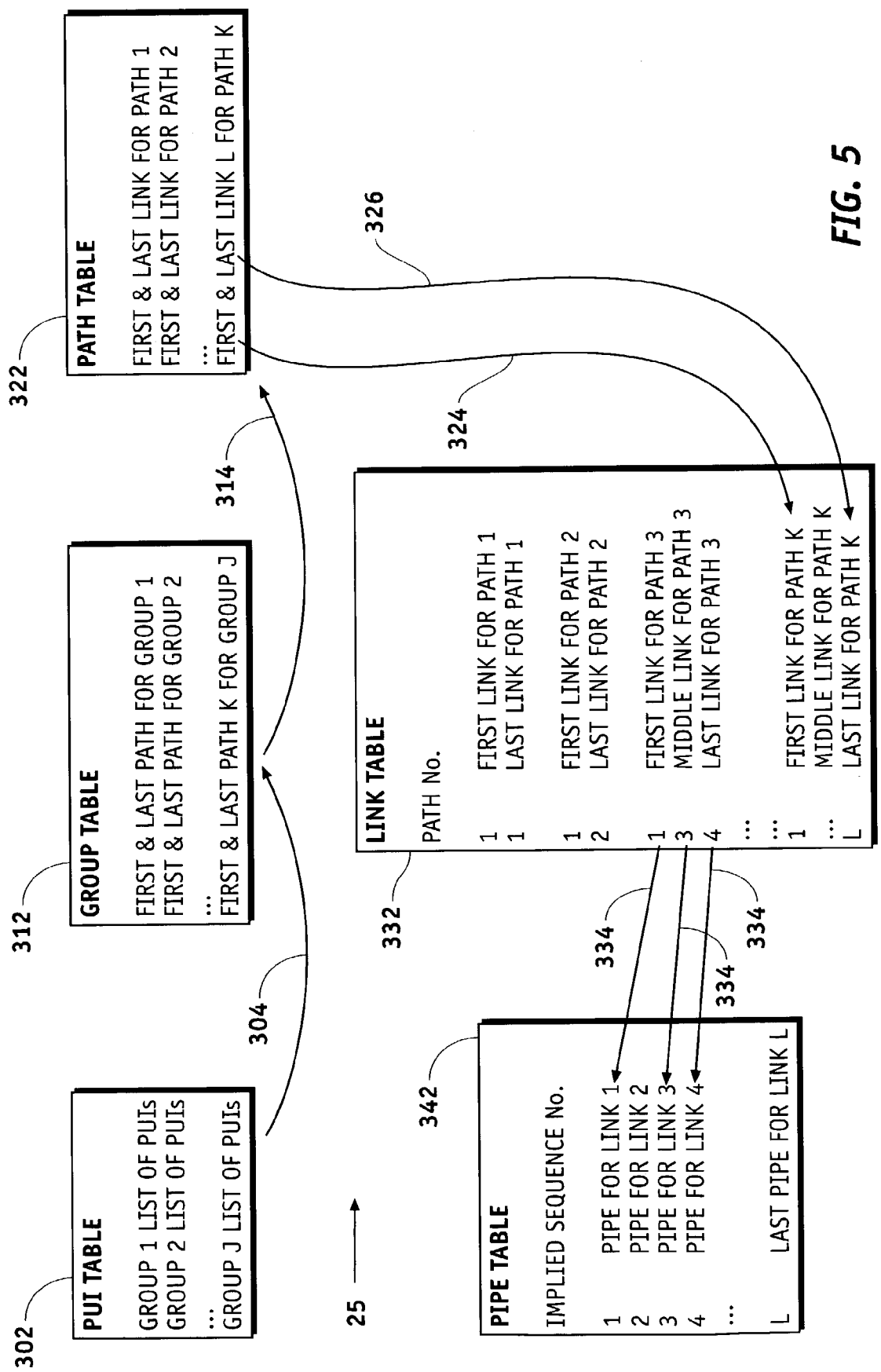
FIG. 5 illustrates s a diagram of an exemplary organization of data structures containing network data.

FIG. 5 shows a diagrammatic overview of exemplary tables 302, 312, 322, 332, and 342 comprising exemplary network data structures 25. Table 302 comprises a set of data lists for each node. Each data list has one PUI, associated data, and a group table index. The sum of all PUIs originating from a particular node may be referred to as a "group." Each node preceding the destination node 102 is represented in the PUI table 302 by the group of PUIs which originate from that node. PUI table 302 associates PUIs with group indexes and, therefore, implicitly associates PUIs with their originating node PUI table 302 may be a lookup table wherein data may be searched by PUI: every PUI is a PUI table index.

Group table 312 associates a range of path table indexes with each group. The range of path table indexes is represented as a first path index and a last path index referenced to lists of paths for each group in path table 332. When telemetry disambiguation program 24 receives a PUI name such as 1206 or 1208, program 24 finds the PUI name in PUI table 302 and thereby finds its group table index. Telemetry disambiguation program 24 then associates 304 the group table index with a data list at the group-indexed slot in the group table 312.

FIG. 4 shows a detailed exemplary PUI table 302 and its relationship to group table 312. The tables in FIG. 4 are shown coded in the C programming language, wherein each table 302 and 312 is a structure-type variable containing data lists, shown in curly brackets. A structure-type variable may be indexed so that individual lists can be accessed by their ordinal position in the variable. Other programming languages may be also be used. PUI data 410 in PUI table 302 comprises a data list in structure type variable, the data list formed by parsing text strings 1208, 1209, and 1210 (FIG.

4) and adding a group table index 411 named "Invalidation-Group." Other PUIs 410 in PUT table 302 are constructed in the same way. Group table 312 comprises an ordered sequence of data lists 410 in a structure-type variable. The data entries in each list 410 comprises a first path index 430, a last path index 431, a switch state variable name 407 parsed from a text string 1203 (FIG. 4) associated with a node 110 in network 12, and a group status indicator 406. The PUIs 410 for each group are associated 304 with the appropriate entry in group table 312 via the group table index 411 "InvalidationGroup" in each PUI list 410 used to index the structure-type variable that is group table 312. For example, group 1 PUIs 402 in PUI table 302 are each associated 304 (FIG. 3) with the group 1 data entry in table 312 via the node index "InvalidationGroup," used to index the structure-type variable that is group table 312. For further example, group 2 PUIs 404 in PUI table 302 are likewise associated 304 (FIG. 3) with the group 2 data entry in table 312 via the group table index 411 "Invalidation-Group" used to index the structure-type variable that is group table 312.

Referring to FIG. 3, path table 322 comprises a structure-type variable containing one list for each path, wherein the lists are structured in sequences by path and by group. The first and last path indexes in a group table 312 entry may be used to find in the path table 322 all paths indexed within the range of paths between the first 430 and last 431 path table indexes. Thus, data relating to all paths of PUIs originating in any particular node 13 (FIG. 1) may be found in the path table 322.

Figure 7:
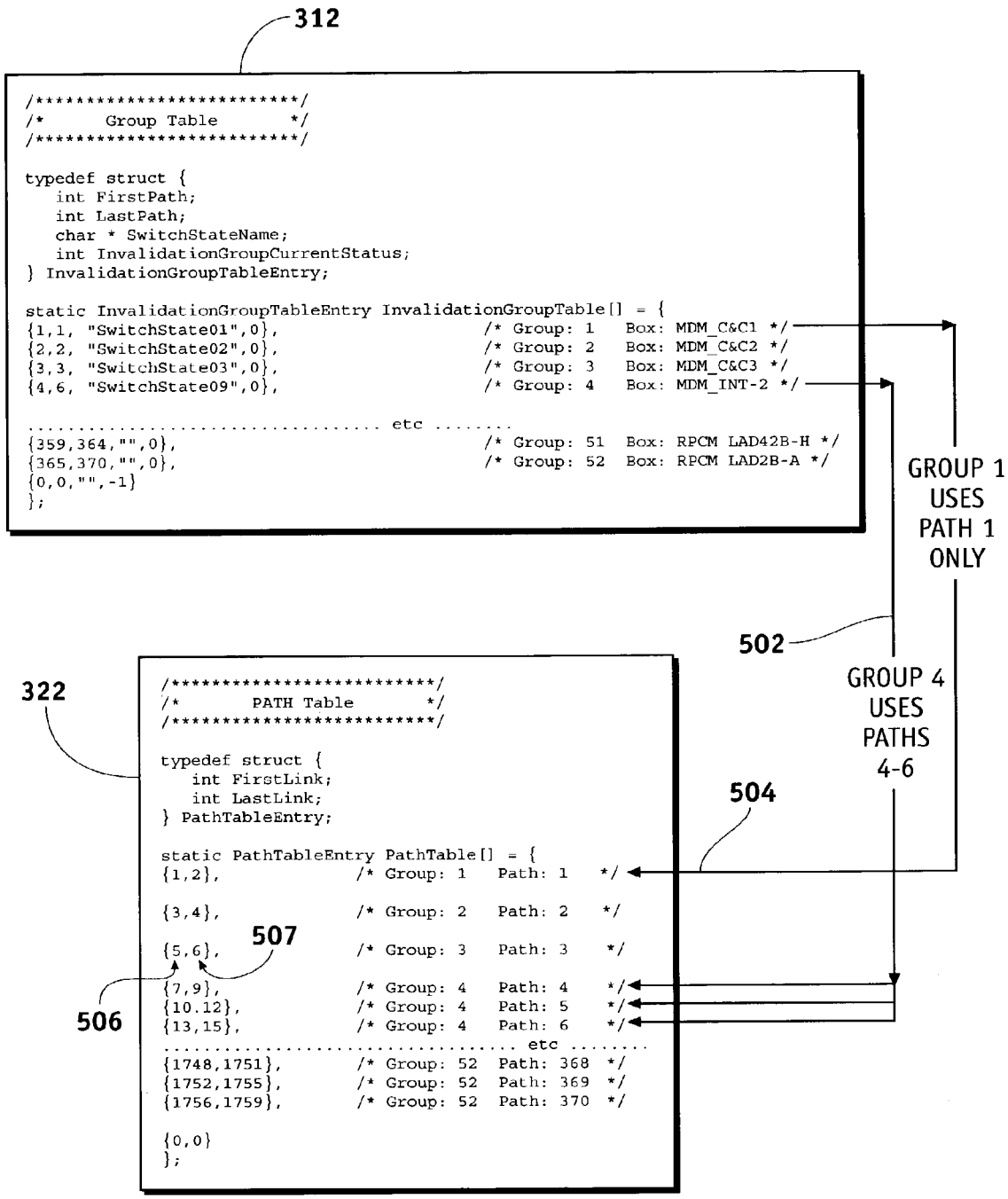
FIG. 7 illustrates details of the exemplary group table in relation to an exemplary path table.

FIG. 7 shows details of the path table 322 and its relationship with group table 312. Each data list in path table 322 comprises a first link table index 506 and a last link table index 507. The first path and last path indexes 506 and 507 of each group table 312 list provide access to each path in the path table 322 associated with each group. For example, group 1 uses only one path 504, indexed as "1" for first and last paths, path 1 associated 314 with the first ordinal position in the structure type variable that is the path table 322. For further example, group 4 uses three paths 502, indexed as 4-6 for first through last paths 502, associated 314 (FIG. 3) with the fourth through sixth ordinal positions in the structure-type variable that is the path table 322. Indexes may be indexed beginning with one or zero as long as some convention is observed.

Referring to FIG. 5, link table 332 comprises ordered sequences of data lists each having a single pipe table index 606 for accessing data from the pipe table 342. Each path has the required number of links to form a path from the originating node to the destination node 102 (FIG. 2). The first link index 506 for a particular path in path table 322 associates 324 with a first link data list for the particular path in the link table 332 and to each successive link data list up to the link data list associated 326 with the last link table index from the path table 322.

Figure 8:
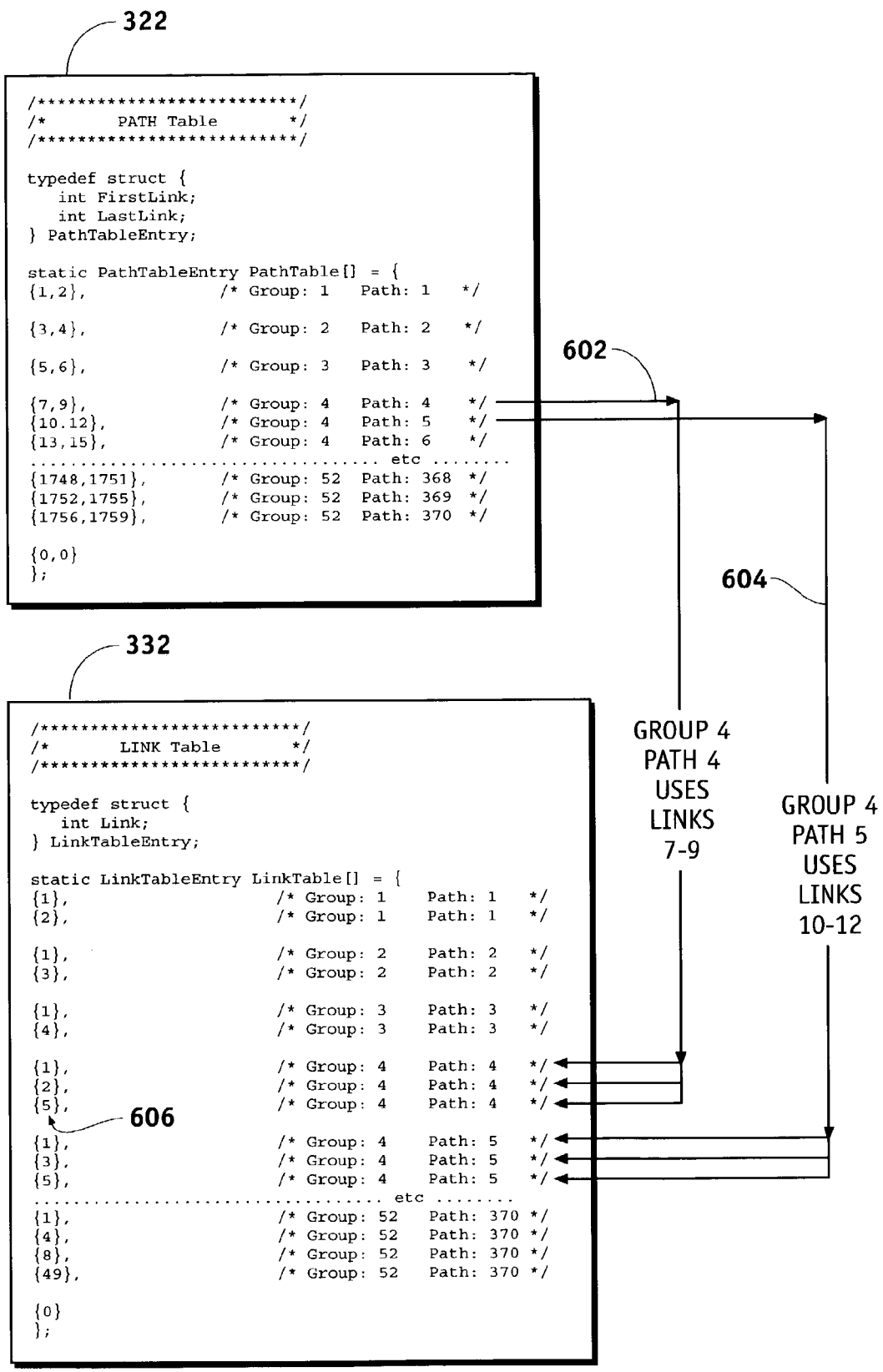
FIG. 8 illustrates details of the exemplary path table in relation to an exemplary link table.

FIG. 8 shows details of the link table 332 and its relationship with path table 322. Link table 332 comprises a structure-type variable containing one list for each link, wherein the lists are structured in sequences by group and by path. Each list comprises a single link represented by an index to pipe table 342. The first link and last link indexes of each path table 322 list provide access to each ordered link sequence in the link table 332. For example, path four 602 of group four listed in path table 322 associates 324 (FIG. 3) first link index "7" with a link in the seventh slot in link table 332. Path four 602 of group four listed in path table 322, associates 326 (FIG. 5) last link index "9" with a link in the ninth slot in link table 332. The ordinal sequence of links 7-9 can thereby be accessed, providing an ordered sequence of pipe table 342 (FIG. 3) indexes {1}-{2}-{5} indicating which physical connections, or pipes, in the network comprise path four 602. By similar exemplary associations 324 and 326 (FIG. 3), the pipe table indexes {1}-{3}-{5} may be obtained for path five 604.

Referring to FIG. 5, pipe table 342 comprises ordered data lists each comprising a counter name and an indicator of node operability, or node status indicator. The pipe table 342 holds one data list for each link. Each link in the link table 332 associates 334 a pipe in the pipe table 342. Each pipe table data list contains data regarding the physical attributes of one link.

Figure 9:
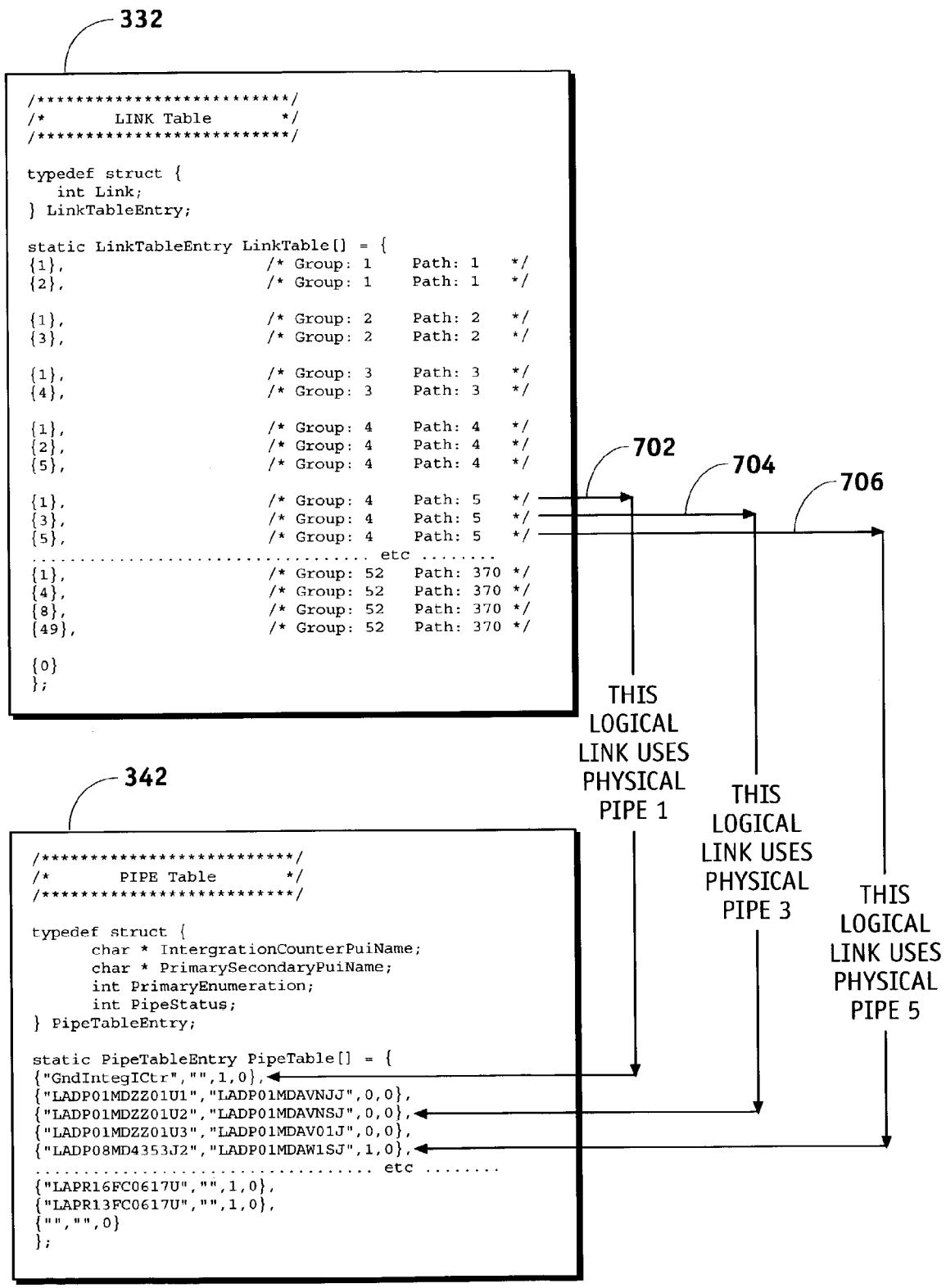
FIG. 9 illustrates details of the exemplary link table in relation to an exemplary pipe table.

FIGS. 9 and 10 show details of the pipe table 342 and its relationship with link table 332. Pipe table 342 comprises a structure-type variable containing one list for each counter 15 (FIG. 1) and, therefore, for each particular node 13 hosting each counter at the source of each link and also for each group of PUIs originating from each particular node. Each list in pipe table 342 comprises a PUI name for a counter 802 used to update an associated pipe status indicator 808, a PUI name for a primary/secondary status indicator 804 to indicate if the node and, therefore, the link is turned off, a reference value 806 containing the value used with the primary/secondary status indicator to indicate primary status, and the pipe status indicator 808. The reference value 806 is necessary because different nodes, having been made by different contractors, may use different values to indicate primary status. Each link 702, 704, and 706 in link table 332 associates 334 (FIG. 3) with one pipe data list.

The pipe status indicator 808 is periodically updated. For example, in a network 12 used by the ISS, telemetry is processed in a series of batch process cycles. The pipe status indicators 808 may be updated once per cycle. In an exemplary embodiment, a pipe status indicator 808 is updated using a function entitled "IsChanging" which takes the counter PUI name 802 for an argument, examines a data history associated with that counter PUI name 802 in ways known in the art, and returns a pipe status indicator 808. Another routine looks up an appropriate data list in the pipe table 342 based on the PUI name and stores the new pipe status indicator 808. In other embodiments, other update periods may be used. For example, an update period based upon a particular counter's update rate may be used. For further example, a pipe status indicator 808 may be updated every time the pipe status changes. A method of updating is discussed in more detail below.

In use, the search routine 1102 of telemetry disambiguation software 24 takes a PUI name for an argument, looks up the PUI name in PUI table, finds the associated group table index to the particular PUI's group in the group table, looks up the indexed group in the group table and finds the associated indexes to the range defined by first and last path indexes in the path table, looks up the indexed range of paths in the path table and finds indexes to the range of links defined by first and last link indexes in the link table, looks up the range of indexed links in the link table and finds the associated indexes to the pipe table, looks up the indexed pipes to find the most recently updated pipe status indicators 808. The telemetry disambiguation software 24 determines if all the pipe status indicators 808 for at least one of the paths from the group from which the target data originates indicate operable nodes, and then the target data is indicated as unambiguous.

Figure 11:
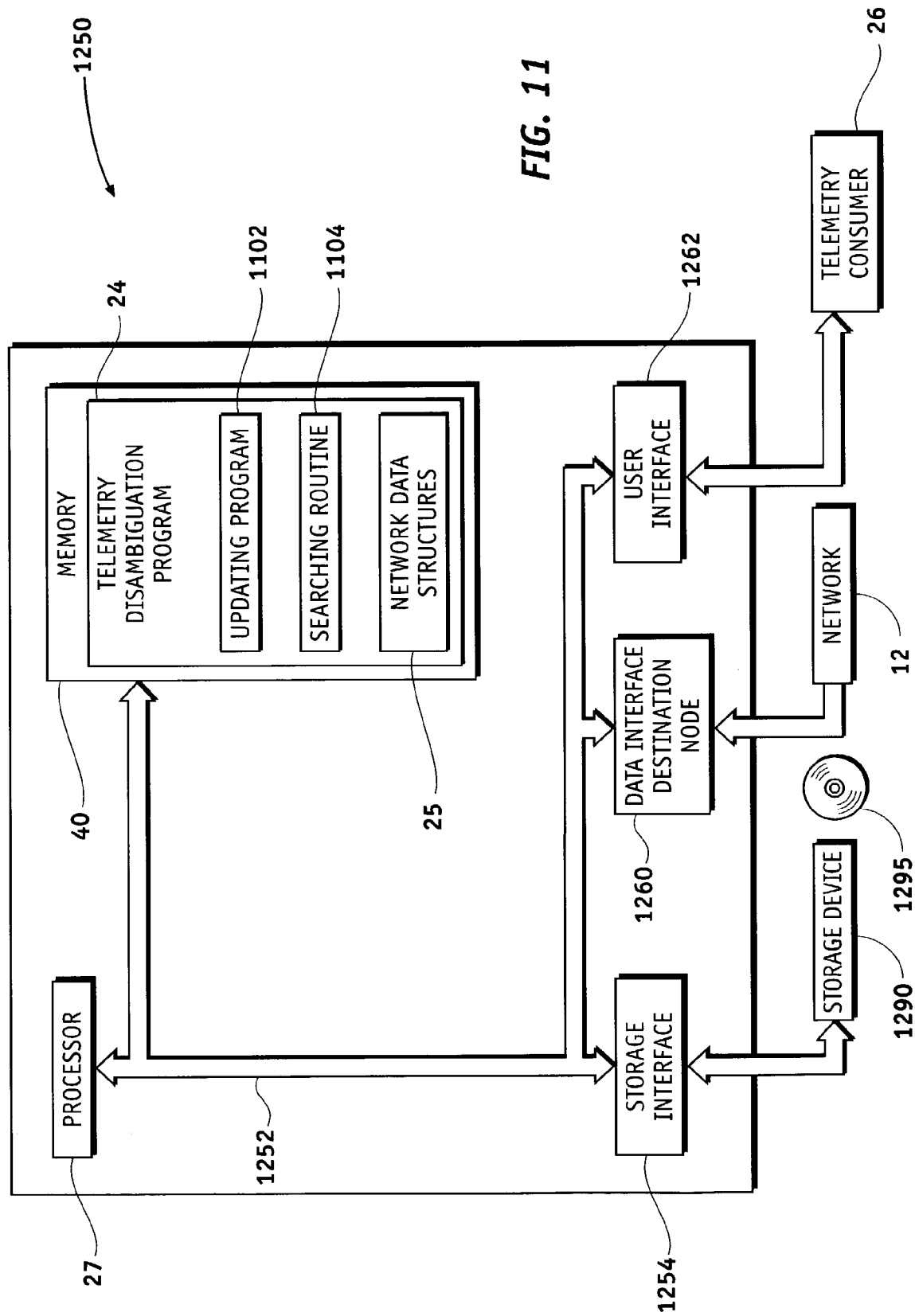
FIG. 11 illustrates an exemplary apparatus for storing, updating, and searching network path data.

FIG. 11 shows a diagram of another exemplary apparatus 1250 for storing, updating, and searching path data for a multi-path, multi-tier network 12 (FIG. 2). The apparatus comprises a processor 27 communicating with a memory 40 over a data bus 1252. Processor 40 further communicates over bus 1252 with storage interface 1254, data interface 1260, and user interface 1262. Storage interface 1254 provides read and write access to storage device 1290 comprising machine readable media, which may include removable machine-readable media 1295. The data interface 1260 provides access to data 30 and 32 (FIG. 1) arriving at the destination node 102 (FIG. 2) of network 12 (FIG. 1). User interface 1262 provides interactive access to consumers of disambiguated telemetry 26 such as an IVHM system, as well as for programmers and database administrators.

Processor 27 may be a plurality of processors 27 which may be associated using networks and/or buses 1252 of any known type. Processor 27 may comprise a dedicated processor chip or any logical device of similar functionality, such as a dedicated logic circuit. The processor 27 is shown and described as electronic but may be magnetic, fluidic, optical, mechanical, or use any other medium known to be suitable for operating logical devices. Memory 40 may be a plurality of memory devices which may be associated using networks and/or buses 1252 of any known type. Memory 40 may include random access memory (RAM) of any known type, compact disk read-only memory (CD-ROM), memory cards, memory sticks, magnetic tape, laser disk, or similarly functional installed or removable devices. Memory 40 may be magnetic, fluidic, optical, mechanical, or use other known medium for data storage.

Figure 6:
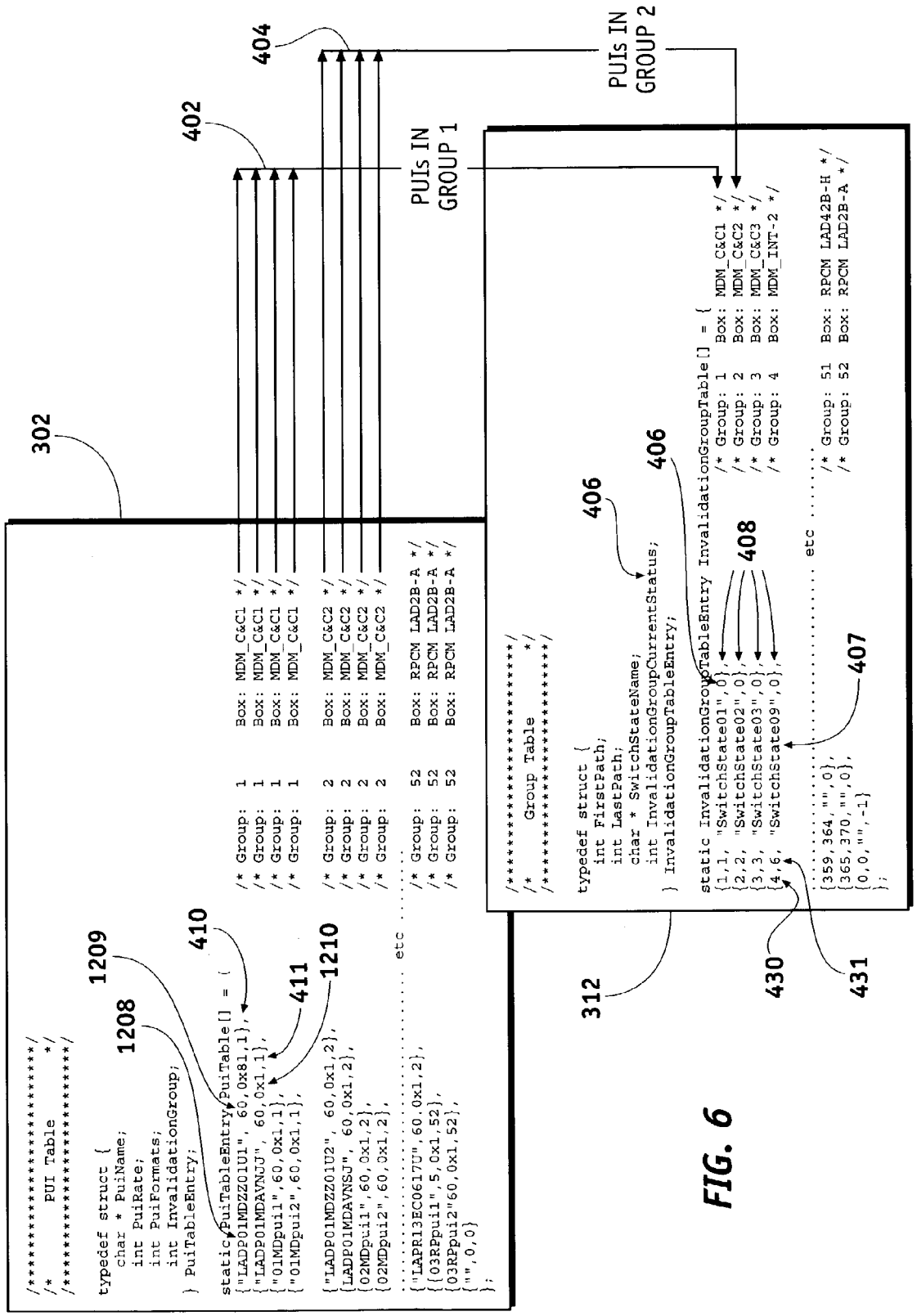
FIG. 6 illustrates details of an exemplary process unique identifier (PUI) table in relation to an exemplary group table.

Memory 40 contains an updating program 1102 operable to update pipe status indicators 808 (FIG. 10) and group status indicators 411 (FIG. 6). The updating program 1280 is preferably an automatic program 1102 responsive to counter data 32 arriving over the data interface 1260 to accomplish the updates. A particular stream of counter data 32 is received as a counter PUI, comprising a counter PUI name 1208 (FIGS. 4 and 6) and its associated data. In an alternate embodiment, the counter data 32 (FIG. 1) may be received and then associated with a counter PUI name 1208.

Network data structures 25 should contain every path from each node to the destination node 102. In most embodiments, the telemetry disambiguation program 24 code is pre-determined and merely needs to be printed to a file for compilation. In some embodiments, the file containing compilable telemetry disambiguation program 24 code may be supplied. The network data structures 25 and the telemetry disambiguation program 24 code may be compiled together to form the telemetry disambiguation program 24.

Telemetry disambiguation program 24 is operable to receive inputs from two sources. First, counter data 32 (FIG. 1) from destination node 102 (FIG. 2) of network 12 (FIG. 1) crosses the data interface 1260 and may be received by a routine or program 1102 in the telemetry disambiguation program 24 operable to update the pipe status indicators 808 (FIG. 10) in the pipe table 342 (FIG. 5). If the counter data 32 (FIG. 1) from a particular node is changing, that node is considered operable and the pipe status indicator 808 (FIG. 10) for that node is updated to indicate that status. Otherwise, the pipe status indicator 808 for that node is set to indicate that the particular node is inoperable. In embodiments which process telemetry 30 in a sequence of batch processes, the pipe status indicators 808 and group (or node) status indicators 411 may be first updated outside of the searching routine 1102 and possibly outside of telemetry disambiguation software 24.

Figure 12:
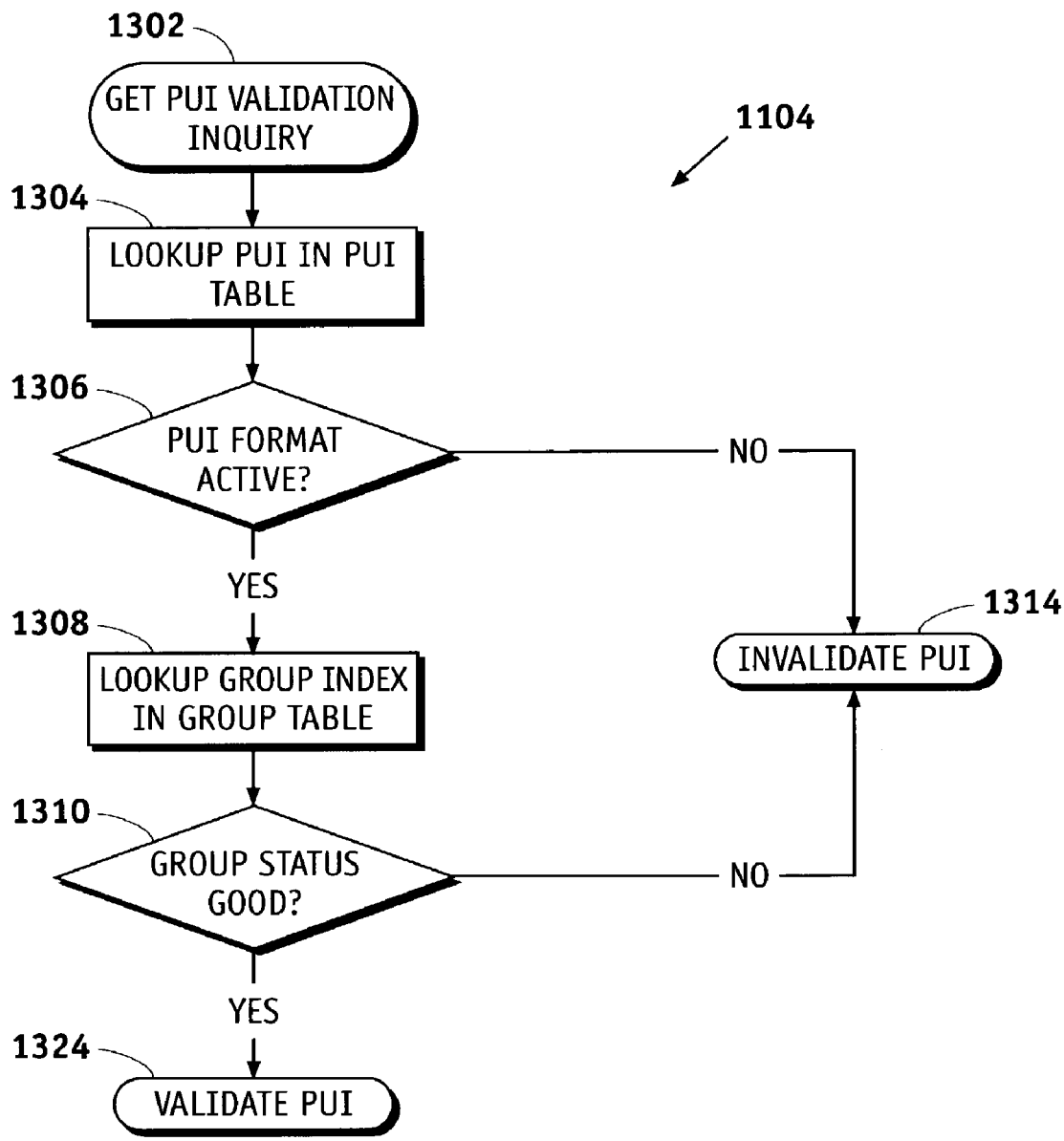
FIG. 12 illustrates a process flow for an exemplary method of searching the apparatus.

FIG. 12 shows a flow chart of an exemplary search routine 1104. Given a PUI validation inquiry in step 1302, the PUI is found in the PUI table in step 1304. A PUI validation inquiry presents the name of a data element, or PUI, in a context of requesting validation. If step 1304 fails to find the PUI, a warning message may be displayed (not shown) and the process aborted. The search routine 1104 next checks the format code 1210 (FIG. 6) to determine if the format code 1210 is an active format code 1210. In most embodiments, this check is to ensure that the PUI can be processed. In some embodiments a separate database of active format codes 1210 may be maintained, and unneeded or unwanted classes of telemetry may be rejected by removing a particular format code 1210 from that database. If the format code is inactive, the PUI is invalidated in step 1314.

If the format code 1210 is active, the group index in the PUI data list in the PUI table 302 is used to lookup 1308 the PUI's group in the group table 312. In step 1310, the group status indicator 411 (FIG. 6) in the group data list is checked. If the group status is not good, the PUI is invalidated in step 1314. Invalidation 1314 as a result of the decision made in step 1310 indicates that the originating node of the PUI has failed. The updating 1102 of group status indicators 411 occurs at the beginning of each batch cycle, so every node 13 without a changing counter data stream 32 will have been marked bad before the first search 1104 occurs. If the path status is good 1316, then the PUI is validated 1324. Otherwise, the PUI is invalidated 1314.

If a good path is found, an indicator that the data of the PUI is unambiguous is associated with the PUI. The associated indicator is returned to the consumer 26. When the consumer 26 is an IVHM system, the data of the PUI is then processed by prognostic and diagnostic algorithms to reach a decision regarding changing the state vector of the telemetered vehicle. The output of the IVHM system may be implemented automatically, resulting in a state change of the vehicle. For example, if diagnostic algorithms of the IVHM system determine that an over-temperature condition exists due to sunlight impingement on a component, the IVHM may change the attitude of the vehicle to cool over-temperature component.

Figure 13:
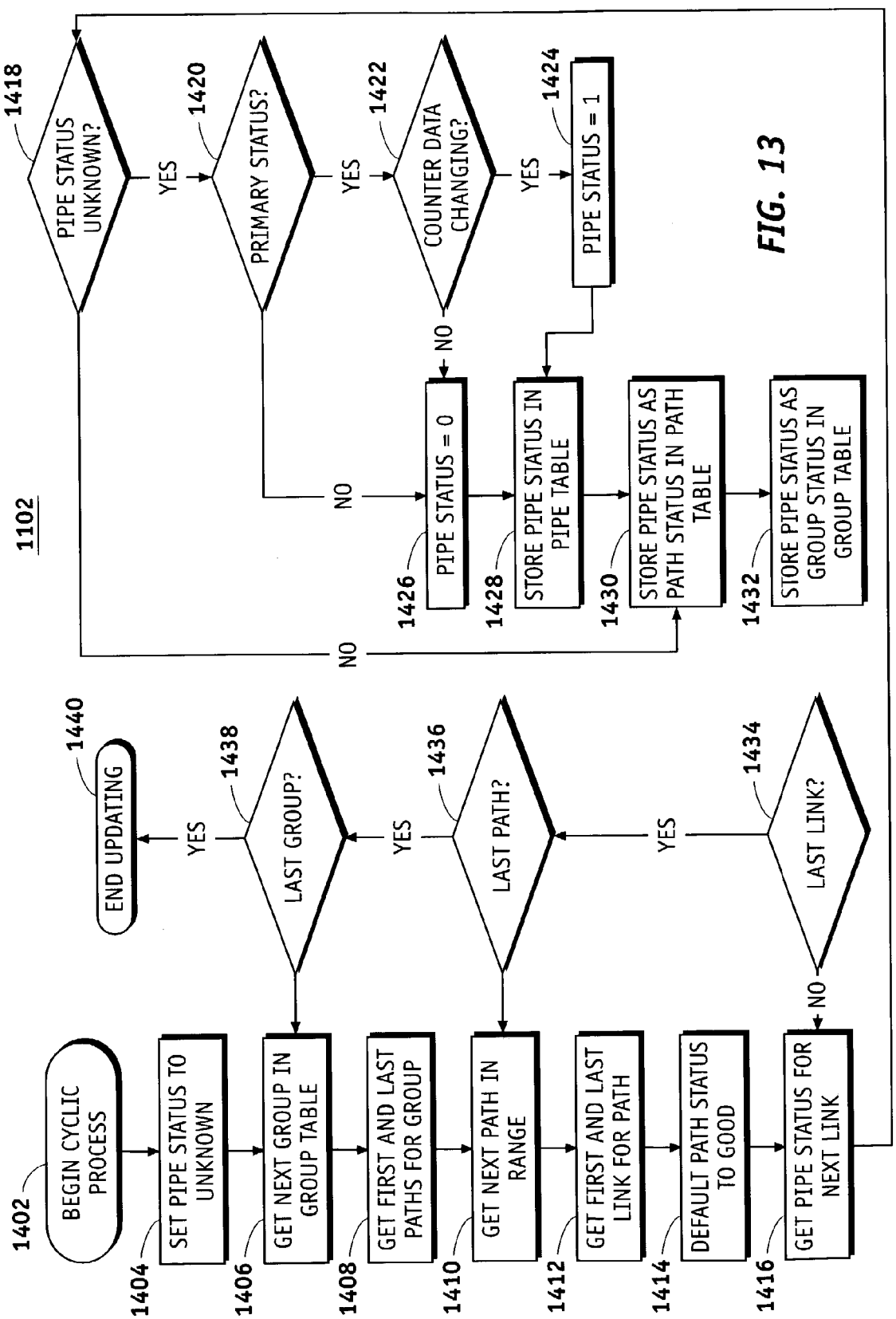
FIG. 13 illustrates a method of storing, or updating, indicators of node operability.

FIG. 13 illustrates an exemplary embodiment of updating program 1102. Step 1402 indicates the beginning of a telemetry batch cycle. Step 1404 sets pipe statuses to unknown to allow updating by exception and to ensure fresh data for the new telemetry processing cycle. Each group may be updated in turn, starting at step 1406. For each group, step 1408 retrieves first and last paths from the path table 322. Beginning in step 1410, the next path of each path in the range between the first and last path, inclusive, is retrieved and the first and last links for that path are retrieved in step 1412. Within a path loop controlled by step 1436, each path status may be defaulted to :good in step 1414 to minimize processing. Step 1416 begins retrieving pipe statuses for each link in turn. Path status indicators (not shown) may be added to the path table,322 to collectively eliminate bad paths for future searches. If the pipe status is unknown 1418, it contains the default value from step 1404 and so is passed to step 1420 for further processing. If the pipe status is not unknown 1418, then the pipe status indicator has already been processed and may be further stored as a path status indicator in step 1430 and as a group status indicator in step 1432.

If the pipe status is unknown 1418, the primary/secondary status PUI 804 (FIG. 10) and 1206 (FIG. 4) in the pipe table 342 is checked to see if the indicator 1206 exists and, if so, does it indicate the node is in primary status. If the indicator shows secondary status 1420, then the pipe is not transmitting and pipe status for the current pipe is set to zero 1426 to indicate an inoperable link. By inference, an inoperable link refers to an inoperable node at the source end of the link. If no indicator exists or if the indicator shows primary status 1420, processing passes to step 1422. Step 1422 determines if the counter PUI for the link under consideration is changing. If so, then pipe status may be set 1424 equal to one to indicate a good pipe and the pipe status is stored 1428 in the pipe table 342 as a pipe status indicator 808. The pipe status indicator 808 may next be stored 1430 as a path status in path table 322, and then stored as a group status indicator 411 in group table 312. The advantage of having a group status indicator 411 is that, for inoperable nodes, the counter PUI causes the entire group to be labeled inoperative, and subsequent PUIs from that group need only be looked up as far as the group table to find that there is no good path from that group.

After processing the current link, a link loop control step 1434 determines if the current link is the last link in the current path. If not, the next link may be brought under consideration in step 1416. If the last link for the current path has been processed, path control step 1436 determines if the current path is the last path in the current group. If not, step 1406 makes the next path the new current path and processing continues. If the last path for the current group has been processed, group control step 1438 determines if the current group is the last group in the current update. If not, step 1406 makes the next group the new current group and processing continues. If the last group has been completely processed, the updating program 1102 ends.

Additional data, unconnected with telemetry disambiguation, may be stored with associated data in various tables and updated as needed. In some embodiments, the network data structure 25 may also be used by various users for purposes unrelated to telemetry disambiguation. In other embodiments, the data structure may be used only for purposes unrelated to telemetry disambiguation.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An apparatus for storing and retrieving data related to paths through a network having a plurality of linked nodes and a destination node, each node of the plurality of nodes having a counter operable to transmit counter data when the node is operating properly, the apparatus comprising:
    a processor coupled to said destination node, wherein said destination node serves as a source of counter data received at said destination node; and
    a memory coupled to said processor, said memory including at least one data structure adapted to associate data relating to designed paths through said network with data relating to said counter data received at said destination node; and
    processor instructions residing in said memory executable to store said data relating to said counter data received at said destination node in said at least one data structure, wherein the counter data of each node is uniquely associated with its respective node and relates to the nodes operability.

2. The apparatus of claim 1, wherein each node of said plurality of nodes has at least one data source operable to produce at least one telemetry item comprising a stream of data elements and a process unique identifier (PUI) for said data elements, wherein said data structure comprises a linear hierarchy of indexed tables.

3. The apparatus of claim 2, wherein at least one said table of said linear hierarchy of indexed tables is configured to store data relating to said counter data.

4. The apparatus of claim 3, wherein said linear hierarchy of indexed tables further comprises a linear hierarchy of directly-addressable indexed tables.

5. The apparatus of claim 3, wherein a first table of said linear hierarchy of indexed tables comprises a look-up table indexed by said PUIs organized by group, each group including the PUIs for data streams originating from each respective node, wherein each PUI is associated with:
    data relating to said each telemetry item identified by each said PUI; and
    an index to a group table.

6. The apparatus of claim 5, wherein said data relating to said each telemetry item comprises a data update rate.

7. The apparatus of claim 6, wherein said data relating to said each telemetry item comprises a data format code.

8. The apparatus of claim 5, wherein said PUI, said data relating to said each telemetry item, and said group index comprise elements in an ordered PUI list.

9. The apparatus of claim 5, wherein a second table of said linear hierarchy of indexed tables comprises said group table, wherein each group table index is associated with:
    a first index to a path table
    a second index to said path table.

10. The apparatus of claim 9, wherein said first index to said path table and said second index to said path table comprise elements in an ordered group list.

11. The apparatus of claim 10, wherein said ordered group list further comprises a status indicator associated with said group.

12. The apparatus of claim 11, wherein said status indicator associated with said group comprises an updatable indicator.

13. The apparatus of claim 10, wherein said ordered group list further comprises data associated with said node originating said each telemetry item.

14. The apparatus of claim 9, wherein a third table of said linear hierarchy of indexed tables comprises said path table, said first index to said path table and said second index to said path table comprising an inclusive range of path table indexes to designed paths from said node originating said telemetry item to said destination node, wherein each path table index is associated with a first index to a link table and a last index to said link table.

15. The apparatus of claim 14, wherein said first index to said link table and said last index to said link table comprise elements in an ordered path list in said path table.

16. The apparatus of claim 15, wherein said ordered path list further comprises an indicator of a status of said path.

17. The apparatus of claim 14, wherein a fourth table of said linear hierarchy of indexed tables comprises said link table, said first index to said link table and said last index to said link table comprising an inclusive range of link table indexes to a sequence of links in each said path, wherein each index to said link table is associated with an index to a pipe table.

18. The apparatus of claim 17, wherein said index to said pipe table comprises an element in an ordered pipe list in said link table.

19. The apparatus of claim 17, wherein a fifth table of said linear hierarchy of indexed tables comprises said pipe table, said pipe table index associate with a counter PUI and a pipe status indicator in said pipe table.

20. The apparatus of claim 19, wherein said counter PUI and said pipe status indicator comprise elements in an ordered pipe list in said pipe table.

21. The apparatus of claim 20, wherein said pipe list further contains a primary/secondary status PUI and a primary status enumeration value.

22. A method of updating a data structure within which resides data related to designed paths in a multi-tier, multi-path communications network, each said designed path including a plurality of linked nodes in a linear sequence from an originating linked node to a destination node, the method comprising the steps of:
receiving counter data arriving at said destination node, said counter data being generated by counters in each linked node, wherein the counter data is uniquely identified with its associated linked node;
determining if said received counter data is changing; and
associating, based upon said determination, an indicator of node operability with said linked node with which said received counter data is associated.

23. The method of claim 22, wherein the steps of associating said indicator of node operability with said node comprises the steps of:
associating a first indicator of node operability with said node if said associated counter data is changing; and
associating a second indicator of node operability with said node if said counter data is not changing.

24. The method of claim 23, further comprising the steps of:
determining if a particular linked node is in primary status; and
associating said second indicator of node operability with said node if said particular node is in secondary status.

25. The method of claim 22, wherein each said link originating from each said linked node in each said designed path is associated with a pipe status indicator in said data structure, the step of associating said indicator of node operability with said node comprising the step of storing said indicator of node operability as said pipe status indicator.

26. The method of claim 22, wherein said data structure further associates each said unique counter data identifier with a group of data identifiers commonly originating from said uniquely associated each respective linked node and with a group status indicator, the step of associating further comprising the steps of:
finding said group associated with said counter unique counter data identifier in said data structure;
finding said group status indicator associated with said found group; and
storing said indicator of node operability as said found group status indicator.

27. The method of claim 26, wherein data structure further associates each group with said designed paths from each said group to said destination node, each said path associated with a path status indicator, the step of associating further comprising the steps of:
finding at least one said designed path associated with said found group;
finding a path status indicator associated with said at least one found path; and
storing said indicator of node operability as said path status indicator.

28. The method of claim 22, further comprising the step of updating data other than status indicators relating to one of said pipe, path and group.

29. A method of searching an apparatus for storing and retrieving data related to paths through a network having a plurality of linked nodes and a destination node, each node of the plurality of nodes having a counter operable to transmit uniquely identified counter data when the node is transmitting telemetry data by exception as designed, the method comprising the step of looking up a unique counter data identifier in a unique identifier table to find a group table index to data relating to a particular group of data commonly originating from said node transmitting said uniquely identified counter data.

30. The method of claim 29, further comprising the step of looking up said group table index in said group table to find a first path table, a last path index to said path table, and a group status indicator associated with said particular group.

31. The method of claim 30, further comprising the steps of:
determining group status from said group status indicator;
if said group status is inoperable, invalidating said telemetry data originating from said node originating said group and terminating said search;
if said group status is operable, validating said telemetry data originating from said node originating said group and terminating said search; and
if said group status is unknown, continuing said search.

32. The method of claim 31, further comprising the step of looking up designed paths between a first path table index and a second path table index, inclusive, in said path table to find, for each path table index, a first link index to a link table and a last link index to said link table.

33. The method of claim 32, wherein said path table includes, for each designed path, a path status indicator, the method further comprising the steps of:
determining a status for said each designed path based on each respective said path status indicator;
if said path status for each said designed path is inoperable, invalidating said telemetry data originating from said node and terminating said search;
if said path status for at least one said designed path is operable, validating said telemetry data originating from said node originating said each designed path; and
if said path status for each said designed path is unknown, continuing said search.

34. The method of claim 33, wherein the step of continuing said search comprises the step of looking up each link sequence between said first link table index and said last link table index, inclusive, in said link table to find, for each link table index, a pipe table index.

35. The method of claim 34, further comprising the step of looking up each pipe table index in said pipe table to find a pipe status indicator for each said link for each said path from said group originating said uniquely identified counter data.

36. The method of claim 35, further comprising the step of determining if any link sequence has associated pipe status indicators each indicating an operable link.

37. The method of claim 36, further comprising the step of validating said data originating from said node originating said designed path if any sequence has associated pipe status indicators all indicating operable links.

38. The method of claim 29, wherein said unique identifier table associates each unique counter data identifier with particular counter format data, the method further comprising the steps of:
  determining from said unique counter format data if said unique counter data has an active format; and
  invalidating said telemetry data originating from said node and terminating said search if said counter format data has an inactive format.

39. A program product comprising program instructions embodied on a processor-readable medium for execution by a programmable processor, wherein the program instructions are operable to cause the programmable processor to:
  store counter data that is unique to each linked node in a multi-tier/multi-path network in a linear hierarchy of directly-addressable indexed tables;
  determine a status indicator of at least one linked node based on its associated counter data that is unique to the linked node; and
  associate a unique identifier relating to counter data that is unique to each linked node with the determined status indicator in the linear hierarchy of directly-addressable indexed tables.

40. The program product of claim 39, wherein the program instructions further associates unique identifiers of data streams with associated nodes originating from associated counter data.

41. The program product of claim 40, wherein the program instructions further associates said unique identifier of data streams with associated paths of nodes from a node originating said data stream to a destination node.

42. The program product of claim 41, the program instructions further associates each said path with each said link in each said path.

43. The program product of claim 41, wherein the program instructions further finds possible paths from said node originating said data stream to said destination node in response to said unique identifier of a data stream.

* * * * *

UNITED STATES PATENT AND TRADEMARK OFFICE
CERTIFICATE OF CORRECTION

| | | |
|---|---|---|
| PATENT NO. | : 7,356,612 B2 | Page 1 of 1 |
| APPLICATION NO. | : 10/465414 | |
| DATED | : April 8, 2008 | |
| INVENTOR(S) | : Rachlin | |

It is certified that error appears in the above-identified patent and that said Letters Patent is hereby corrected as shown below:

At Claim 2, Column 12, line 7, please replace "(PUI) for said" with --(PUI) for said stream of said--.

At Claim 19, Column 13, line 6, please replace "associate" with --associated--.

At Claim 30, Column 14, line 21, please replace "first path table," with --first path index to a path table,--.

At Claim 37, Column 15, line 1, please replace "any sequence" with --any link sequence--.

Signed and Sealed this

Twenty-first Day of December, 2010

David J. Kappos
*Director of the United States Patent and Trademark Office*